Dec. 30, 1930.　　　E. O. GOLDBECK　　　1,787,309
PHOTOGRAPHIC APPARATUS
Filed April 16, 1929　　2 Sheets-Sheet 1
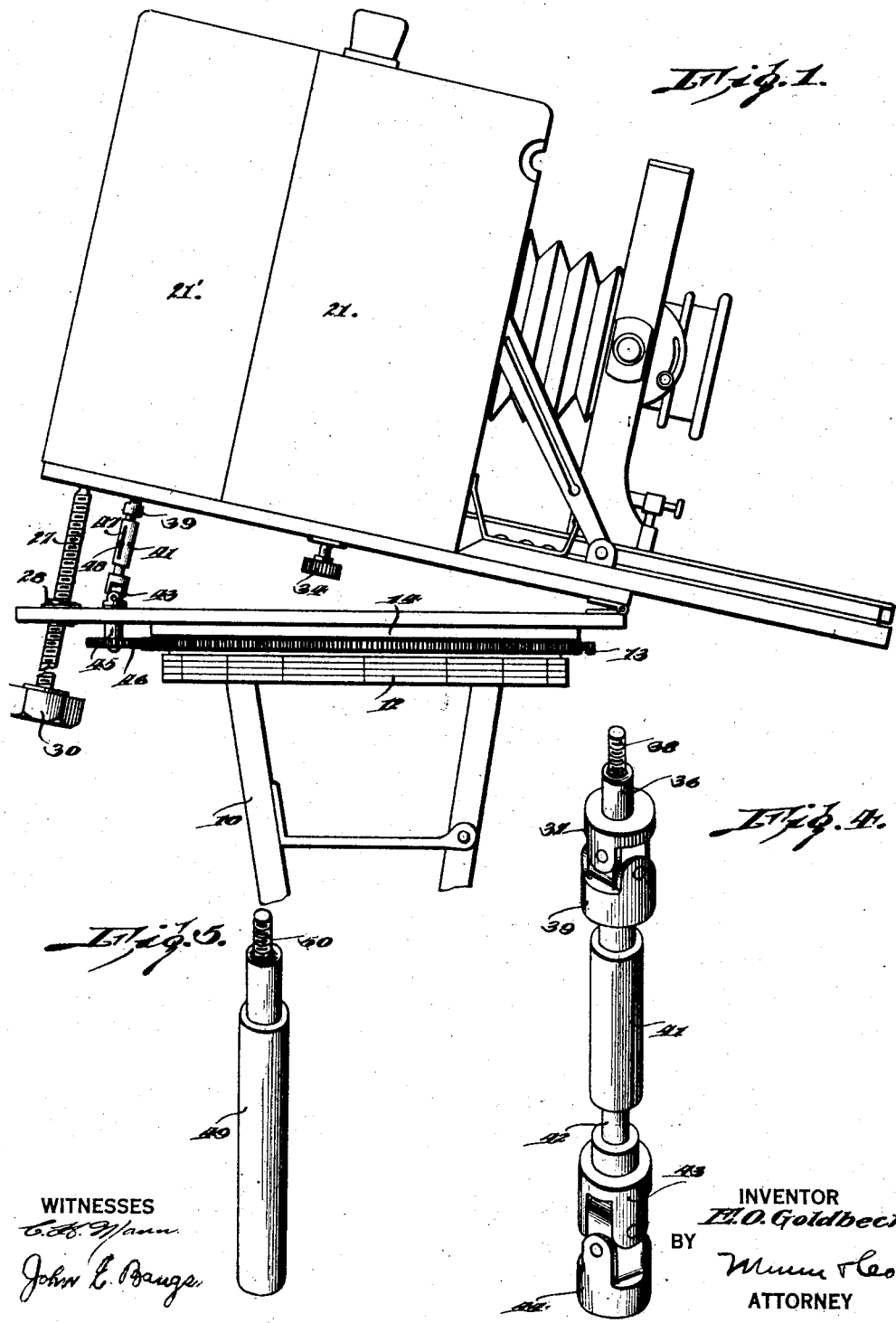

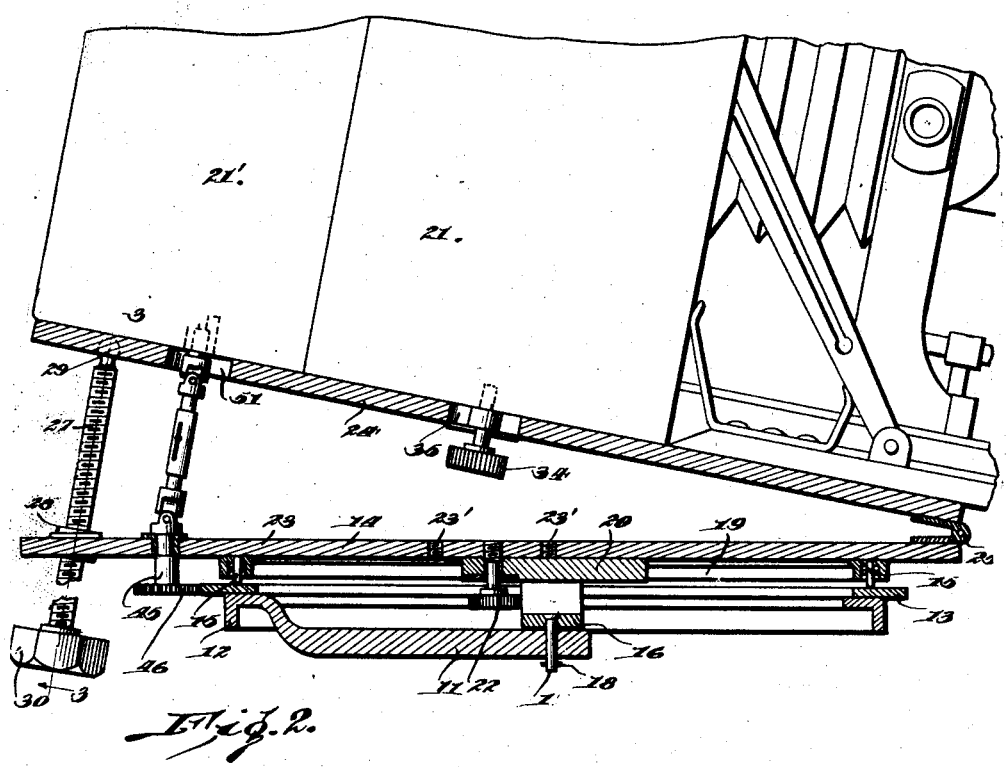

Patented Dec. 30, 1930

1,787,309

UNITED STATES PATENT OFFICE

EUGENE O. GOLDBECK, OF SAN ANTONIO, TEXAS

PHOTOGRAPHIC APPARATUS

Application filed April 16, 1929. Serial No. 355,573.

This invention appertains to improvements in photographic apparatus generally, and more particularly to a supporting means for cameras, especially panoramic cameras.

Heretofore in the practice of panoramic photography, particularly in the use of the cyclograph type of such cameras, wherein the image is projected on a moving film strip or the like, through an angle of three hundred and sixty degrees (360°), the camera employed has been secured in position on a revoluble support or turntable, which, in turn, is mounted on the upper end of a vertically and angularly adjustable support, such as a tripod or the like.

In the use of a camera so mounted, it often becomes necessary to dispose the same at an angle to the ground surface, which is accomplished by spreading one or more of the legs of the tripod to a greater or lesser degree to secure the proper angular disposition of the camera, especially in the photographing of large assemblages of persons, or long stretches of landscape, but, in so doing, only a limited angular movement of lens travel is effective in traversing the width of the image by reason of the path of travel of the lens being, of a necessity, always in fixed relation to the angle of inclination of the camera and its revoluble support at the upper end of the tripod, and the consequent upward arcing of the path of its travel in opposite directions from the vertical center of the image, which results in the lens passing from its focus on the image into and above the horizon. With a camera of this type revolved in a horizontal plane, the views taken by the same are sometimes disappointing on account of the development of cylindrical perspective on a plane surface, causing apparent distortion, and this distortion is further accentuated in the views made by the camera, when the same is revolved in angular relation with respect to the ground surface.

It is, therefore, an object of the present invention to provide a means of support for a panoramic camera of the class set forth, which will effectively overcome this otherwise serious fault in the operation of a camera by allowing for the desired angular adjustment of the camera on the revolving turntable, while the latter is maintained in a horizontal plane on its support, or tripod, with respect to the ground surface, and, as a consequence whereof, the path of travel of the lens of the camera will also be in a horizontal plane toward a desired angle of the travel of the same, which will be determined by the width of the image to be photographed.

Another object of the invention is to provide an auxiliary support, as hereinbefore characterized, which is of a comparatively simple but durable and efficient combination, construction and arrangement of parts, and which is capable of being easily and readily secured in position on any standard form of revoluble mounting of a usual tripod, or other support, without in any way modifying the structure of the latter.

A further object of the invention is to provide a means for readily and easily accomplishing the operative action of the actuating motor of the camera with the stationary gear carried at the upper end of the tripod or other support, whereby the desired revolving movement will be imparted to the turntable, the auxiliary support, and the camera, which is sustained in position on the latter.

With the foregoing and other equally important objects and advantages in view, the invention resides in the certain new and useful combination, construction and arrangement of parts, as will be hereinafter more fully described, set forth in the appended claims, and illustrated in the accompanying drawings, in which:

Figure 1 is a side elevation of the upper end of a conventional form of panoramic camera support showing a practical embodiment of the auxiliary support as applied thereto, and with a standard form of panoramic camera as it appears when operably mounted thereon, Figure 2 is an enlarged fragmentary side elevation of the camera with the main and auxiliary supports thereof in vertical section, Figure 3 is a vertical transverse section taken on the line 3—3 of Figure 2, Figure 4 is a perspective view of the adjustable shaft for operably connecting the actuating motor of the camera to the stationary turntable gear correspondingly for various angles of adjustment of the camera and the upper portion of the auxiliary support, and whereby the camera, together with the turntable, will be revolved when the motor is set in operation, and Figure 5 is a view similar to that in Figure 4, but showing a shaft section to be employed for increasing the length of the adjustable shaft aforesaid for still greater angular adjustments of the auxiliary support.

Referring to the drawings, wherein like characters of reference designate corresponding parts throughout the several views thereof, the usual panoramic camera equipment, to which the invention is to be applied, is constituted in the usual tripod legs 10, which are hinged at their upper ends to the lower side of a radially extending arm 11. An annulus 12 is carried at the outer end of the arm 11, and has its outer face formed to provide a scale graduated in degrees. Fixedly secured on the upper side of the annulus 12 is a ring gear 13, which is concentrically disposed thereon, and has its outer toothed peripheral edge overhanging the outer scaled face of the same.

Mounted above the ring gear 13 is a turntable 14, which is also in the form of an annular metal ring, and has its under face provided with a series of spaced recesses in each of which a roller 15 is transversely journaled for rolling contact with the upper face 13. The turntable 14 is formed with a diametrically extending and depressed pivot bar 16, from the center of which a pivot pin 17 depends for engagement in a vertical opening formed for its reception in the center of the inner end of the radial arm 12. A cotter pin or the like 18 may be engaged through an opening formed diametrically of the lower end of the pivot pin 17 to prevent accidental displacement of the turntable 14 from operative position. Extending chordially of the open center of the turntable ring 14, in right-angular relation to the pivot bar 16 are a pair of spaced parallel guide bars 19, between which a block or plate 20 is slidably mounted.

With the tripod support thus constructed and arranged, it has heretofore been the practice to place a panoramic camera 21 in a centered position directly on the turntable 14, and to secure the same to the slide block or plate 20 by means of a thumb screw or the like 22, in which position the rear end of the camera will overhang the underlying peripheral edge portions of the turntable 14 and the stationary gear 13 for the gearing of the actuating motor of the toothed edge of the latter.

When the camera and its support is now set up in a position of use, the legs of the supporting tripod will be adjustable vertically and spread apart in a manner to thereafter allow the lens of the camera to be properly focused on the image to be photographed. In making panoramic pictures, the legs of the tripod support are sometimes spread apart to dispose the camera in an inclined position, and with the lens thereof pointing in a downward direction toward the image as is well understood.

To avoid the objectionable features of supporting and operating the camera, the present invention provides a support, which is angularly adjustable in a vertical direction, so that the camera is displaced from the horizontal to a proper or desired inclined position with reference to the image to be photographed, while the legs of the tripod are spread apart in a manner only to level the turntable with respect to the ground surface.

This auxiliary support is made up of a lower member or plate 23 to be laid directly upon the upper side of the turntable 14, and an upper member or plate 24, which is arranged to overlie the lower member or plate 23, and is hinged, as at 25, at one end to a complemental end of the lower plate 23 for angular adjustments relative thereto.

The lower member or plate 23 is formed with a series of equi-distantly spaced, screw-threaded openings 23' which are disposed in line with and at intermediate points along the longitudinal center thereof for the secured engagement therewith of the thumb screw 22, heretofore employed for securing the camera 21 directly to the turntable 14.

To effect the vertical adjustment of the upper member or plate 24 on its hinge connection 25, and with respect to the lower member or plate 23, a pair of hand screws 27 are provided, and the same are screw threaded upwardly through a pair of bearing members or plates 28 swivelled transversely of the lower member or plate 23, and has spaced openings formed therein toward the opposite ends of the rear end edge thereof. The upper ends of these adjusting screws 27 are preferably formed with rounded or spherical portions 29 disposed in engagement with similarly shaped sockets formed in the lower face of the upper member or plate 24, while the lower ends thereof are provided with enlarged polygonal finger pieces or heads 30 to facilitate their manipulation.

The bearing members or plate 28 are formed in the form of metal disks, each having a pair of pivot pins 31 projecting outwardly from the peripheral edges thereof in diametrical alinement, and for seated engagement in radial grooves or notches formed in the upper face of the lower member or plate 23 at the opposite sides of the openings formed in the same for the reception of these members or plates as hereinbefore indicated. These pivot pins 31 are housed within the grooves or notches by means of plates 32 secured crossways of the latter by means of screws or the like 33.

In the use of the auxiliary support, thus provided, the panoramic camera will be seated lengthwise upon the upper plate 24, and is secured thereon by means of a thumb screw or the like 34 passed upwardly of a slotway 35, which is formed at an intermediate point on the longitudinal center of the same for threaded engagement in a complementally threaded socket formed in the lower side of the forward section of the camera. When properly positioned, the lens end of the camera will be extended outwardly of the hinged ends of the supporting plates 23 and 24, and consequently in a declined plane with respect to the ground surface, and correspondingly with the angular inclination of the upper plate 24.

To operably connect the gear train or clockwork mounted within the rear detachable portion of the camera 21, to the stationary gear 13 for the revolving of the camera and the turntable in proper direction, and correspondingly for various angular adjustments of the upper supporting block 24 relative to the lower plate 23, an extensible shaft, as shown in Figures 4 and 5 is provided. This shaft comprises an upper section 36, projecting from the upper portion 37 of a universal joint, and has a reduced and screw-threaded extension 38 to be secured in a complementally threaded socket formed in the lower end of the shaft of one of the gears making up the gear train or clockwork of the actuating motor (not shown) of the camera. The lower member 39 of the universal joint aforesaid has a shaft section 40 projecting downwardly from its lower end, and provided with a tubular extension 41 which is telescopically engaged over a lower shaft section 42 projecting upwardly from the end of the upper member 43 of a lower universal joint. The lower member 44 of this latter universal joint has its lower end formed to provide a screw threaded socket to receive the upper and reduced threaded end of a shaft section 45 on the lower end of which a toothed gear 46 is secured.

As shown in Figures 1 and 2, the tubular extension 41 is formed with a longitudinally extending slot 47, which is engaged by a guide pin 48 carried by the lower solid shaft section 42. This slot and pin connection allows for the desired transmission of power from the actuating motor of the camera to the gear 46, which, as it rotates, traverses the toothed periphery of the stationary gear 13, and thereby acts to revolve the turntable 14, together with the auxiliary support and the camera mounted thereon, as well as the extending of the shaft to the limits of the length of the slot 47, and correspondingly with the various angular adjustments of the upper supporting plate 24 of the auxiliary supporting device.

To increase the length of the extensible shaft for use in operably connecting the camera motor to the stationary gear 13 when greater angular inclinations are required for the upper supporting member or plate 24, an additional rigid shaft section 49 is provided and, as shown in Figure 5, it has its upper end reduced and screw threaded, as at 50, for engagement in the socket in the gear shaft end aforesaid usually engaged by the similar end 38 of the extensible shaft structure, while its lower end is formed with an axial socket into which the end 38 of the extensible shaft will be secured.

In the operation of the camera when mounted on this auxiliary support, it will be readily apparent that regardless of the angle of inclination of the upper supporting member or plate 24, the path of travel of the lens of the camera will always be in a horizontal plane parallel to that of the turntable 14 and the ground surface, when the turntable 14 is set level to the latter, and the turntable is caused to revolve about its pivot 17 by the starting up of the actuating motor, which then drives the gear 46 relative to the stationary gear 13 by imparting a rotary movement of the extensible shaft aforesaid to that end. Now, as the gear 46 rotates, it traverses the toothed periphery of the stationary gear 13, and thereby revolves the camera 21, the auxiliary support 23—24 and the turntable 14 as a unit.

It is to be noted that, for different focal lengths of the lens of the camera, a corresponding change in the revolving speed of the camera and its immediate supports must be provided for, and this is accomplished by employing a number of different sizes of driving gears, which are interchangeable with the gear 46. Each of these gears are provided with a hub extension or shaft section 45, which has its free end reduced and screw threaded for engagement in the complemental screw-threaded socket formed in the section 44 of the lower of the universal joints. To mesh any one of these several interchangeable gears with the stationary gear 13, the auxiliary support 23—24 will be adjustable lengthwise on the turntable 14, by moving the same with the slide block or plate 20 in either direction along the parallel guide 19, and a further adjustment may be had by engaging the thumb screw 22 in any one of the several openings 23′ spaced along the longitudinal center of the lower supporting plate 23. Also to vary the angular relation of the extensible shaft depending from the camera 21, with reference to the opening in the lower supporting plate 23 in which the lower universal joint section 44 engages the thumb screw, a slot connection 34—35, between the upper supporting plate 24 and the camera 21, readily allows for a required lengthwise adjustment of the latter on the plate 24 for the purpose. It will also be noted that the upper supporting plate 24 is provided with an opening 51, which is of a size to expose therethrough the socket connection for the upper end section 36 of the extensible shaft, so that the reduced and screw-threaded end 38, or 50, as the case may be, may be readily engaged with the socket at all times, and regardless of the position of adjustment of the camera 21 on the plate 24.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

Having thus fully described the invention, what is claimed is:

1. The combination with a panoramic camera including a turntable therefor, of an auxiliary support mounted on said turntable to sustain a camera thereon, said auxiliary support comprising a lower fixed member and an upper member hingedly connected at its forward end to the forward end of the lower member, and means for adjusting said upper supporting member and the camera carried thereby to dispose the same angularly with respect to the lower member in a manner whereby the travel of the lens of the camera will be in a horizontal plane at all times.

2. The combination with a panoramic camera including a turntable therefor, of an auxiliary support mounted on said turntable to sustain a camera thereon, said auxiliary support comprising a lower fixed member and an upper member hingedly connected at its forward end to the forward end of the lower member, means for adjustably securing a camera in position on the upper of said members, and means for adjusting said upper supporting member and the camera carried thereby to dispose the same angularly with respect to the lower member in a manner whereby the travel of the lens of the camera will be in a horizontal plane at all times.

3. The combination with a panoramic camera including a tripod and a turntable mounted on the tripod, of an auxiliary support mounted on said turntable to sustain a camera thereon, said auxiliary support comprising a lower fixed member and an upper member hingedly connected at its forward end to the forward end of the lower member, means for adjusting said upper supporting member and the camera carried thereby will be angularly disposed and to tilted position whereby the travel of the lens thereof will be maintained in the same horizontal plane at all times, and means for operably connecting the actuating motor of the said camera to the said revoluble turntable.

4. The combination with a panoramic camera including a turntable therefor, of an auxiliary support detachably mounted on said turntable, said auxiliary support comprising a lower stationary member and an upper member hingedly connected at its forward end to the forward end of the lower member, said upper member being adapted to receive a camera thereon with the lens end of the camera directed toward the hinged end thereof, means for tilting said upper member on its hinge connection to dispose said camera carried thereby at a desired angle and in a manner whereby the travel of the lens of the camera will remain in substantially the same horizontal plane at all times, and a means for operably connecting the actuating motor of the said camera to the said turntable and correspondingly for the various angular adjustments of the said auxiliary support and said camera.

5. The combination with a panoramic camera including a main support, a stationary gear carried by the main support, and a turntable mounted above the gear, of an auxiliary support adapted to be mounted on said turntable to sustain a camera in position thereon, said auxiliary support comprising a lower stationary member and an upper member hingedly connected at its forward end to the forward end of the lower member, said upper member being adapted to receive a camera thereon with the lens end of the camera directed toward the hinged end thereof, means for angularly tilting said auxiliary support and the camera carried thereby in a manner that the travel of the lens of the camera will be in a substantially horizontal plane at all times, and an extensible shaft for operably connecting the actuating motor of the said camera to the said stationary gear.

6. In a support for panoramic cameras, a turn table, a fixed gear below said turn table, an auxiliary support detachably mounted on said turn table, said auxiliary support comprising a lower member and an upper member hingedly connected at its forward end to the forward end of the said lower member, the said upper member being adapted to receive a camera thereon with the lens of the camera extending forwardly of the hinge connection between the members, a movable gear in mesh with said fixed gear, an extensible connection between said movable gear and the actuating motor of the camera, and means carried by the said lower member and engageable with the said upper member to tilt the latter to dispose the camera at various angles relative to the said lower member and turn table and whereby the lens of the camera will remain in substantially the same horizontal plane at all times.

7. In a support for panoramic cameras, a turn table, a fixed gear below said turn table, an auxiliary support mounted on said turn table, said auxiliary support comprising a lower member and an upper member hingedly connected at its forward end to the forward end of the said lower member, the said upper member being adapted to receive a camera thereon with the lens of the camera projecting forwardly of the hinge connection between the members, a movable gear journaled in the said lower member and arranged in mesh with said fixed gear, an extensible connection between said movable gear and the actuating motor of the camera, and means carried by the said lower member and engageable with the said upper member to tilt the latter to dispose the camera at various angles relative to the said lower member and turn table and whereby the lens of the camera will remain in substantially the same horizontal plane at all times.

8. In a support for panoramic cameras, a turn table, a fixed gear below said turn table, an auxiliary support detachably mounted on said turn table, said auxiliary support comprising a lower member and an upper member hingedly connected at its forward end to the forward end of the said lower member, the said upper member being adapted to receive a camera thereon with the lens of the camera projecting forwardly of the hinge connection between the members, a movable gear journaled in the said lower member and arranged in mesh with said fixed gear, an extensible connection between said movable gear and the actuating motor of the camera, and an adjusting screw mounted in the said lower member and having its upper end bearing against the lower side of the said upper member to turn the same to dispose the camera at various angles to the said lower member and said turn table and whereby the lens of the camera will remain in the same horizontal plane at all times.

EUGENE O. GOLDBECK.